3,309,271
METHODS AND COMPOSITION FOR
INDUCING CHOLERESIS
Andre Henri Eugene Georges, Ottignies, Belgium, assignor to Manufacture de Produits Pharmaceutiques A. Christiaens, Societe Anonyme, Brussels, Belgium
No Drawing. Filed Aug. 24, 1964, Ser. No. 391,735
Claims priority, application Belgium, Aug. 30, 1963, 510,328, Patent 636,828
6 Claims. (Cl. 167—55)

The present invention is concerned with pharmaceutical compositions possessing remarkable choleretic activity.

It is known that theophylline possesses in addition to its well known antispasmodic and vasodilator properties a certain choleretic activity. This latter activity, however, is quite insufficient to justify the administration of theophylline for these exclusive choleretic phenomena.

However, it has now been discovered, not without surprise, that certain derivatives of theophylline and analogous substances possess a remarkable choleretic activity which exceeds to a great extent that of theophylline. Certain of these derivatives even present a choleretic activity superior to that of known choleretic agents.

The compounds possessing choleretic properties to which the present invention relates have the general formula:

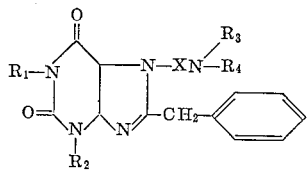

in which $R_1$ and $R_2$ which may be the same or different designate lower alkyl radicals such as the methyl radical, X designates the group of the formula $(CH_2)_n$ in which $n$ is an integer less than 4, $R_3$ and $R_4$ designate lower alkyl, aryl, alkaryl, hydroxyalkyl, hydroxyalkaryl radicals or form together with the adjacent nitrogen atom a heterocyclic ring which may be substituted. $R_3$ can also designate a hydrogen atom in which case $R_4$ designates an alkyl, aryl or alkaryl radical.

Among the compounds which may be used in the form of acid addition salts with pharmacologically acceptable acids such as hydrochlorides, sulphates, tartrates and analogues, one may cite by way of non-limiting examples the following:

7-($\beta$-diethylaminoethyl)-8-benzyl-theophylline
7-($\beta$-dimethylaminoisopropyl)-8-benzyl-theophylline
7-($\gamma$-dimethylaminopropyl)-8-benzyl-theophylline
7-(methylamino-ethyl)-8-benzyltheophylline
7-(ethylamino-ethyl)-8-benzyltheophylline
7-(n-propylamine-ethyl)-8-benzyltheophylline
7-(allylamino-ethyl)-8-benzyltheophylline
7-(diallylamino-ethyl)-8-benzyltheophylline
7-(butylamino-ethyl)-8-benzyltheophylline
7-(isobutylamino-ethyl)-8-benzyltheophylline
7-(benzylamino-ethyl)-8-benzyltheophylline
7-(phenylethylaminoethyl)-8-benzyltheophylline
7-(cyclohexylaminoethyl)-8-benzyltheophylline
7-(piperidinoethyl)-8-benzyltheophylline
7-(N-methyl-piperazinyl-ethyl)-8-benzyltheophylline
7-[N-($\beta$-hydroxyethyl-piperazinyl-ethyl)]-8-benzyltheophylline
7-(morpholino-ethyl)-8-benzyltheophylline
7-(pyrrolidino-ethyl)-8-benzyltheophylline
7-aminoethyl-8-benzyltheophylline
7-(isopropylamino-ethyl)-8-benzyltheophylline
7-[N-(diethylaminopropyl)-aminoethyl]-8-benzyltheophylline
7-(N-methyl-N-butyl-aminoethyl)-8-benzyltheophylline
7-(N-$\alpha$-methyl-$\beta$-phenylethylaminoethyl)-8-benzyltheophylline
7-(1'-furfurylaminoethyl)-8-benzyltheophylline
7-(hexamethyleneiminoethyl)-8-benzyltheophylline
7-(hexylaminoethyl)-8-benzyltheophylline
7-(isoamylaminoethyl)-8-benzyltheophylline
7-(isoamylaminopropyl)-8-benzyltheophylline
7-(hexylaminopropyl)-8-benzyltheophylline
7-(cyclohexylaminopropyl)-8-benzyltheophylline
7-(piperidinopropyl)-8-benzyltheophylline
7-(hexamethyleneiminopropyl)-8-benzyltheophylline
7-(isoamylaminobutyl)-8-benzyltheophylline
7-(hexylaminobutyl)-8-benzyltheophylline
7-(cyclohexylaminobutyl)-8-benzyltheophylline
7-(piperidinobutyl)-8-benzyltheophylline
7-(hexamethyleneiminobutyl)-8-benzyltheophylline
7-(N-$\beta$-hydroxyethylamino-ethyl)-8-benzyltheophylline
7-(N-methyl-N-$\beta$-hydroxyethylamino-ethyl)-8-benzyltheophylline
7-(N-ethyl-N-$\beta$-hydroxyethylamino-ethyl)-8-benzyltheophylline
7-(N-bis-$\beta$-hydroxyethylamino-ethyl)-8-benzyltheophylline
7-(N-$\beta$-hydroxypropylamino-ethyl)-8-benzyltheophylline
7-(N-$\alpha$-dimethyl-$\beta$-hydroxyethylamino-ethyl)-8-benzyltheophylline
7-(N-methyl-N-$\alpha$-methyl-$\beta$-phenyl-$\beta$-hydroxyethylaminoethyl)-8-benzyltheophylline
7-(N-ethyl-N-$\beta'$-hydroxyethyl-$\gamma$-aminopropyl)-8-benzyltheophylline
7-(N-ethyl-N-$\beta'$-hydroxyethyl-aminobutyl)-8-benzyltheophylline
7-(N-ethyl-N-$\beta'$-hydroxyethyl-$\beta$-methyl-$\gamma$-aminopropyl)-8-benzyltheophylline.

The compounds of Formula I are known and can be prepared in the manner described in Belgian Patents Numbers 602,888 and 603,114 and in U.S. Patent Number 2,887,486.

The present invention is concerned with pharmaceutical compositions for use as choleretic medicaments containing as active ingredient at least one compound of Formula I preferably in the form of an acid addition salt with a pharmacologically acceptable acid.

The choleretic activity of the compounds of Formula I has been tested by the evidence of the studies effected on rats by a process allowing direct collection of the hepatic bile to the exclusion of all other pancreatic duct secretions.

This process which is analogous to the process of Debray et al., J. Physiol. 54: 459–499 (1962) is as follows: The animal, kept alive up to now by a diet comprising commercially usual fodder and water as desired, is anaesthetised by an intraperitoneal injection of urethane in a dose of 1.2 g./kg. in the form of a 30% solution in distilled water. It is then attached by the paws in the dorsal decubitus on a small hammock raised to 5–6 cm. with respect to the level of the table. By a median opening effected in the epigastric region of the abdominal wall one finds the duodenum by slightly removing the hepatic lobe which covers it. The duodenal loop is revealed in a manner such as to recognise the bile duct by transparency in the mesenteric layer.

The bile duct being laid open one disengages it cautiously without the juxtahepatic portion over a length of 2 to 3 mm. where one effects an opening into which one introduces a very fine cannula in drawn glass by a fine tube of polyethylene. The cannula being fastened by a ligature, the organs are replaced in the normal position and the abdominal wall is reclosed by means of a clasp.

From this moment the animal is kept in an enclosure in which a temperature of 30° C. prevails.

The polyethylene catheter is connected to a receptacle having a very narrow orifice (to avoid evaporation) previously standardised and positioned at a lower level than the said animal in order not to create any hydrostatic counter pressure which may be capable of hindering the free flow of the bile.

When the bile flows out from the free end of the catheter, the product to be examined is administered intravenously into a saphenous vein and a chronometer started. Immediately afterwards the animal receives subcutaneously an injection of 7 ml. of physiological water in order to provide it with a convenient hydration.

The collecting flask of bile is weighed half-hourly for four hours.

The applicant has effected these tests according to the above described procedure with a variety of compounds of Formula I as well as with known compounds such as theophylline and a well known choleretic agent viz. sodium α-(hydroxy-1-cyclohexyl)butyrate. Among the compounds of Formula I which have been the object of said tests one may cite 7-(β-diethylaminoethyl)-8-benzyltheophylline (compound I),
7-(pyrrolidinoethyl)-8-benzyltheophylline (compound II),
7-N-ethyl-N-β-hydroxyethylamino-ethyl)-8-benzyl-theophylline (compound III),
7-(morpholinoethyl)-8-benzyltheophylline (compound IV) and
7-(N-bis-β-hydroxyethylaminoethyl)-8-benzyl-theophylline (compound V).

In the tests in question each compound has been used to test twenty male rats of average weight 450 g. The majority of the rats received a dose of 20 mg./kg. of the compound to be tested in solution in physiological serum while the remainder of the rats received a corresponding quantity of physiological serum alone.

Table I below gives the results obtained. The numbers indicated in the table represent the mean of the total weight (in mg.) of the collected bile secretion in terms of the four hour test.

TABLE I

| Compound tested: | Weight of bile secretion |
|---|---|
| Control | 2710 |
| Theophylline | 2900 |
| Sodium-α-(hydroxy-1-cyclohexyl)-butyrate | 3610 |
| Compound I | 3588 |
| Compound II | 3659 |
| Compound III | 3743 |
| Compound IV | 5273 |
| Compound V | 3145 |

This table shows that the compounds used in the pharmaceutical compositions according to the invention, in particular 7-(morpholinoethyl)-8-benzyltheophylline, possess a remarkable choleretic activity, this activity being surprisingly much greater than that of theophylline and on occasions greater than that of an existing choleretic agent [sodium-α-(hydroxy-1-cyclohexyl) butyrate].

The choleretic pharmaceutical compositions according to the invention may be presented in the form of solid or liquid preparations for oral administration, in the form of suppositories, or in the form of liquid preparations for parenteral administration (intramuscular or intravenous).

The following examples are given by way of illustration only are are not limiting and describe several pharmaceutical compositions according to the invention.

*Example 1.—A compressed tablet containing 300 mg. of active ingredient*

7 - (morpholinoethyl) - 8 - benzyltheophylline hydrochloride, mg. ---- 300
Excipient, q.s.

The compressed tablets may contain conventional excipients such as talc, magnesium stearate, starch, sucrose, lactose, gelatine and even colouring agents, for example, sunset yellow, tartrazine, amaranth, erythrosine, indigotin, brilliant black, flavouring agents and conventional conservation agents.

In place of compressed tablets one can also manufacture dragees using dragefying or conventional coating agents such as sucrose, gum arabic, sandaric, etc.

*Example 2.—Suppositories containing 400 mg. of active ingredient*

7 - (N - ethyl-N-β-hydroxyethylamino-ethyl)-8-benzyltheophylline hydrochloride, mg. ---- 400
Suppository mass, q.s.

*Example 3.—Oral suspension*

7 - (β - dethylaminoethyl) - 8 - benzyl - theophylline hydrochloride, mg. ---- 40–100
Sorbitol solution, ml. ---- 20
Distilled water, ml. ---- 50
Aroma, q.s.

Instead of being presented as an oral suspension the active ingredient can be presented as a syrup or in drops.

*Example 4.—Injectible solution containing 300 mg. of active ingredient*

7 - (morpholinoethyl) - 8-benzyltheophylline hydrochloride, mg. ---- 300
Physiological serum, ml. ---- 5

The dose of active ingredient of the choleretic compositions according to the invention may ve varied between wide limits. The doses may be given in 2 to 2.5 grammes per day and are preferably distributed in several graduated doses according to the desired chloretic effect.

Clearly the invention is not limited to the details described above and numerous modifications may be made to these details without departing from the spirit of the invention which is defined in the following claims.

I claim:

1. A method of inducing choleresis in the biliary duct of an animal which comprises administering to an animal in need of such treatment a choleretically effective amount of a member selected from the group consisting of the compounds of the formula

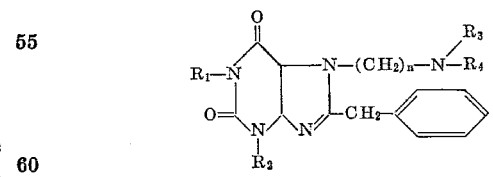

and pharmaceutically acceptable acid addition salts thereof, wherein each of $R_1$ and $R_2$ is lower alkyl, $n$ is an integer not greater than 4, each of $R_3$ and $R_4$ independently, is a member selected from the group consisting of lower alkyl, phenyl lower alkyl and hydroxy lower alkyl, and wherein $R_3$ and $R_4$ when taken together form with the adjacent nitrogen atom a member selected from the group consisting of morpholino, pyrrolidino, hexamethyleneimino and piperazino.

2. A choleretic pharmaceutical composition in dosage unit form for inducing choleresis in the biliary duct consisting essentially of an active ingredient and a pharmaceutically acceptable carrier therefor, said unit containing from 40 to 400 mg. of said active ingredient, the latter being 7-(N-ethyl-N-β-hydroxyethylamino - ethyl)-8-benzyltheophylline hydrochloride.

3. A method of inducing choleresis in the biliary duct of an animal which comprises administering to an animal in need of such treatment a choleretically effective amount of a member selected from the group consisting of 7-(β-diethylaminoethyl)-8-benzyltheophylline,
7-(β-dimethylaminoisopropyl)-8-benzyltheophylline,
7-(γ-dimethylaminopropyl)-8-benzyltheophylline,
7-(methylaminoethyl)-8-benzyltheophylline,
7-(ethylaminoethyl)-8-benzyltheophylline,
7-(n-propylaminoethyl)-8-benzyltheophylline,
7-(allylaminoethyl)-8-benzyltheophylline,
7-(diallylaminoethyl)-8-benzyltheophylline,
7-(butylaminoethyl)-8-benzyltheophylline,
7-(isobutylamino-ethyl)-8-benzyltheophylline,
7-(benzylaminoethyl)-8-benzyltheophylline,
7-(phenylethylaminoethyl)-8-benzyltheophylline,
7-(cyclohexylaminoethyl)-8-benzyltheophylline,
7-(piperidinoethyl)-8-benzyltheophylline,
7-(N-methylpiperazinylethyl)-8-benzyltheophylline,
7-[N-(β-hydroxyethylpiperazinylethyl)]-8-benzyltheophylline,
7-(morpholinoethyl)-8-benzyltheophylline,
7-(pyrrolidinoethyl)-8-benzyltheophylline,
7-aminoethyl-8-benzyltheophylline,
7-(isopropylaminoethyl)-8-benzyltheophylline,
7-[N-(diethylaminopropyl)-aminoethyl]-8-benzyltheophylline,
7-(N-methyl-N-butylaminoethyl)-8-benzyltheophylline,
7-(N-α-methyl-β-phenylethylaminoethyl)-8-benzyltheophylline,
7-(1'-furfurylaminoethyl)-8-benzyltheophylline,
7-(hexamethyleneiminoethyl)-8-benzyltheophylline,
7-(hexylaminoethyl)-8-benzyltheophylline,
7-(isoamylaminoethyl)-8-benzyltheophylline,
7-(isoamylaminopropyl)-8-benzyltheophylline,
7-(hexylaminopropyl)-8-benzyltheophylline,
7-(cyclohexylaminopropyl)-8-benzyltheophylline,
7-(piperidinopropyl)-8-benzyltheophylline,
7-(hexamethyleneiminopropyl)-8-benzyltheophylline,
7-(isoamylaminobutyl)-8-benzyltheophylline,
7-(hexylaminobutyl)-8-benzyltheophylline,
7-(cyclohexylaminobutyl)-8-benzyltheophylline,
7-(piperidinobutyl)-8-benzyltheophylline,
7-(hexamethyleneiminobutyl)-8-benzyltheophylline,
7-(N-β-hydroxyethylaminoethyl)-8-benzyltheophylline,
7-(N-methyl-N-β-hydroxyethylaminoethyl)-8-benzyltheophylline,
7-(N-ethyl-N-β-hydroxyethylaminoethyl)-8-benzyltheophylline,
7-(N-bis-β-hydroxyethylaminoethyl)-8-benzyltheophylline,
7-(N-β-hydroxypropylaminoethyl)-8-benzyltheophylline,
7-(N-α-dimethyl-β-hydroxyethylaminoethyl)-8-benzyltheophylline,
7-(N-methyl-N-α-methyl-β-phenyl-β-hydroxyethylaminoethyl)-8-benzyltheophylline,
7-(N-ethyl-N-β'-hydroxyethyl-γ-aminopropyl)-8-benzyltheophylline,
7-(N-ethyl-N-β'-hydroxyethylaminobutyl)-8-benzyltheophylline,
7-(N-ethyl-N-β'-hydroxyethyl-β-methyl-γ-aminopropyl)-8-benzyltheophylline, and acid addition salts thereof with pharmaceutically acceptable acids.

4. A method of inducting choleresis in the biliary duct of an animal which comprises administering to an animal in need of such treatment a choleretically effective amount of 7-(morpholinoethyl)-8-benzyltheophylline hydrochloride.

5. A method of inducing choleresis in the biliary duct of an animal which comprises administering to an animal in need of such treatment a choleretically effective amount of 7-(N-ethyl-N-β-hydroxyethylaminoethyl)-8-benzyltheophylline hydrochloride.

6. A method of inducing choleresis in the biliary duct of an animal which comprises administering to an animal in need of such treatment a choleretically effective amount of 7-(β-diethylaminoethyl)-8-benzyltheophylline hydrochloride.

References Cited by the Examiner
UNITED STATES PATENTS
2,887,486  5/1959  Leake _____ 260—256

OTHER REFERENCES
Christiaens: A. Chem. Abstracts, 56 (1952), page 5980g.

ALBERT T. MEYERS, Primary Examiner.
S. J. FRIEDMAN, Assistant Examiner.